Oct. 18, 1932.  O. U. ZERK  1,883,274
LUBRICANT RESERVOIR AND DASH PUMP
Filed Jan. 15, 1927   2 Sheets-Sheet 1

Inventor
Oscar U. Zerk
By Williams, Bradbury,
McCaleb & Hinkle
Attys.

Oct. 18, 1932.   O. U. ZERK   1,883,274
LUBRICANT RESERVOIR AND DASH PUMP
Filed Jan. 15, 1927   2 Sheets-Sheet 2
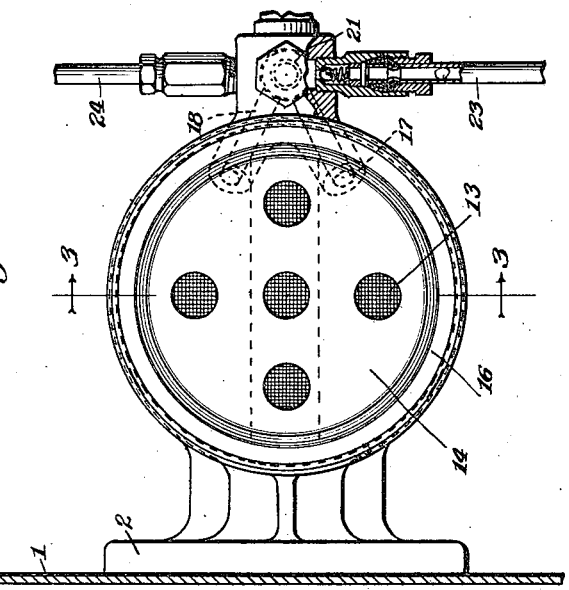
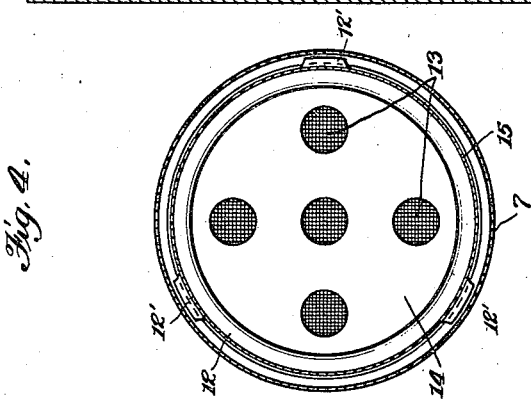
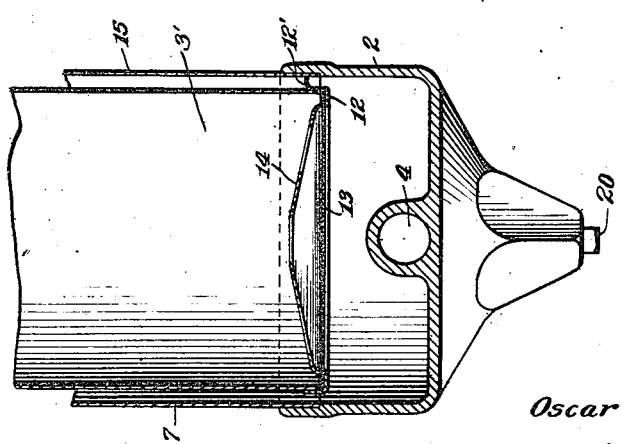
Inventor
Oscar U. Zerk Patented Oct. 18, 1932

1,883,274

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICANT RESERVOIR AND DASH PUMP

Application filed January 15, 1927. Serial No. 161,281.

My invention relates to a lubricant reservoir and pump unit for use in the so-called centralized systems of lubrication for lubricating a plurality of bearings from a single source. Lubricating systems of the centralized type comprise in general a source of lubricant supply, means for forcing the lubricant from the source of supply through branched conduits to the bearings to be lubricated, and metering means in the conduits and adjacent the bearings to control the quantity of lubricant supplied to each bearing. Centralized lubricating systems are now being extensively used to lubricate the chassis bearings of automotive vehicles, and my invention is particularly designed for use with the centralized lubricating systems applied to such vehicles.

An object of my invention is to provide a combined lubricant reservoir and manually operated pump for use as a part of the centralized lubricating system of automotive vehicles.

Another object is to provide a new and improved unit which is simple in construction, economical to manufacture and reliable in operation.

Another object is to provide a combined reservoir and pump unit particularly adapted for mounting on the dash of an automotive vehicle.

Another object is to provide a combined reservoir and pump for mounting on the dash of an automotive vehicle and which maintains all lubricant on the engine side of the dash and prevents any lubricant from passing to the operator's side thereof.

Another object is to provide a construction wherein the pump is normally disconnected from the reservoir.

Another object is to provide means whereby the system may be readily primed and any air trapped therein quickly removed.

Another object is to provide a combined reservoir and pump unit in which the lubricant passing from the reservoir to the pump flows downwardly and then upwardly thereby freeing itself of impurities.

Another object is to provide a new and improved pump piston.

Another object is to provide a combined lubricant reservoir and pump unit which is extremely compact and wherein the vital parts are readily accessible.

Another object is to provide a new and improved strainer for the lubricant.

Another object is to provide means whereby air trapped in the reservoir and beneath the strainer may readily escape when a new supply of oil is poured into the reservoir.

Another object is to provide a new and improved means for sealing the top of the reservoir.

Other objects and advantages will appear as the description proceeds.

Referring to the drawings, Figure 1 is a sectional elevation of my new and improved reservoir and pump;

Figure 2 is a plan view of the right-hand half of Figure 1 with the top of the reservoir removed;

Figure 3 is a section on the line 3—3 of Figure 2; and

Figure 4 is a section on the line 4—4 of Figure 1.

Figure 1:
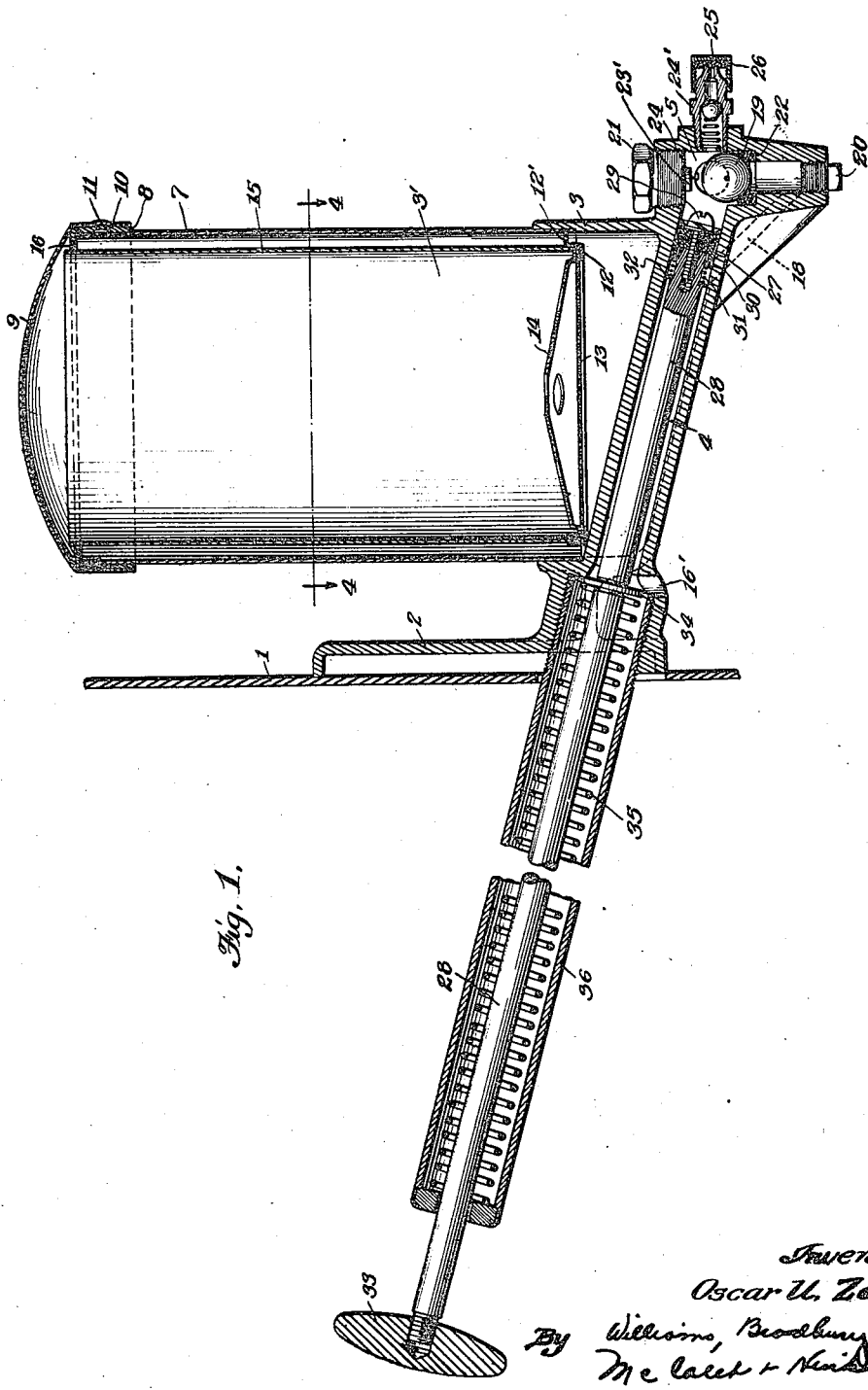

Referring to the drawings, and more particularly to Figure 1, I have illustrated my new and improved unit as attached to the dash of an automotive vehicle, that part of my device appearing on the right of the dash in Figure 1 being located in the engine compartment of the vehicle, while that part appearing to the left of the dash in Figure 1 is to be understood as extending into the driver's compartment of said vehicle.

The combined lubricant reservoir and pump unit which constitutes my invention, is attached to the dash by any well known securing means extending through the bracket 2 which forms a part of a unitary casting having a part 3 forming the bottom of the reservoir, and also constituting the pump cylinder 4, and the part 5 which serves as a valve chamber connecting the cylinder 4 with the bottom part 3 of the reservoir 3'.

The novel reservoir comprehended by my invention comprises the aforesaid bottom portion 3 and a thin metallic shell extending upwardly therefrom and forming the main part of said reservoir. To the upper end of the shell 7 is soldered or otherwise secured, a reinforcing ring 8 having a projection 10 for interlocking with a depression 11 carried by the cap 9, this interlocking serving to retain the cap firmly upon the reservoir. Both the ring 8 and the cap 9 are formed by stamping and are accurately made so as to provide a lubricant-tight seal there-between, which effectively prevents the leakage of any lubricant from the top of the reservoir. This construction is simple and economical to manufacture, since it permits the use of a thin and inaccurate shell, yet provides an effective seal for the lubricant and sufficient reinforcement of the shell to accomplish the desired purpose.

In lubricating systems of the type to which my invention is applied, it is desirable to provide means for straining the lubricant prior to forcing it through the conduits and to the bearings. I provide a novel means for thus straining the lubricant, which means comprises a cup-like ring 12 placed in the bottom of the reservoir and having spaced projections 12' for centering it therein. Carried by this ring is a straining element 13 of fine wire mesh or other suitable material, and above this element is located the perforated conical plate 14 which serves as a protector for said element. Also carried by the cup-like ring 12 is a tubular member 15 extending slightly above the upper end of the shell 7 and maintained centrally thereof by the flange 16 of the ring 8. The dimensions of this tubular member 15 and the flange 16 are such as to provide a narrow opening there-between, which is effective in preventing lubricant passing down between the tubular member and the shell when the reservoir is filled, but which permits the escape of any air which may be trapped beneath the straining element during such filling operation. This provision of means whereby that part of the reservoir below the strainer is maintained in communication with the atmosphere is particularly important where lubricant of high viscosity is used, and effectively prevents the trapping of air which would subsequently be forced into the conduits and form air pockets therein.

I have found it extremely desirable to provide a construction in which the pump cylinder does not extend into the operator's compartment. Where the pump cylinder or any part of the apparatus which is either continually or intermittently filled with lubricant, extends into the operator's compartment, there is always a possibility of such lubricant leaking into the compartment and soiling the clothes of the occupants thereof. In order to avoid leakage of oil into the operator's compartment, I provide a combined lubricant reservoir and pump unit, in which the cylinder of a pump is located inside the reservoir and is co-extensive therewith.

Referring to Figure 1 of the drawings, it will be seen that the pump cylinder 4 is located inside of the bottom of the reservoir 3' and that the rear end of the active part of said cylinder does not extend beyond the rear wall of the reservoir. The forward end of the cylinder is connected to the reservoir through the valve chamber 5 and the conduits 17 and 18. The conduits 17 and 18 extend from the lowermost portions of the reservoir and from points on opposite sides of the cylinder to the lower end of the valve chamber and beneath the check valve 19. This construction is extremely compact and has the additional advantages of permitting the use of a downwardly closing check valve for normally maintaining the pump cylinder out of communication with the reservoir and thereby eliminating leakage past the piston in said cylinder.

That part of the valve chamber 5 above the valve 19 and its associated washer 22 is in communication with the conduits 23 and 24 leading to the bearings to be lubricated. In the top of the valve chamber 5 is a removable plug 21 for providing easy access to the valve 19. The plug 21 is provided with a boss 23' for positioning the upper end of a spring to assist in retaining the valve 19 on its seat, should the addition of such a spring be desirable. The valve nipple 24' communicates with the interior of the chamber and provides means whereby a lubricant gun may be connected for the purpose of priming the system or blowing out at high pressure any air which may become trapped therein. A cover 25 is provided for the nipple 24' and has a sealing disk 26 which effectively excludes dirt therefrom. A plug 20 is provided at the lower end of the valve chamber and beneath the valve 19 in order that dirt which may settle in the lower end of said chamber may be readily removed.

My invention comprehends a novel piston 27 formed of two oppositely extending cup leathers separated by a metallic washer and secured to the reduced end of the piston rod 28 by means of a screw 29. A transversely diagonal washer 30 is urged against the end of the inner cup leather by a spring 31, whose opposite end rests against a washer 32 abutting the shoulder formed by the reduced end of the piston rod. This construction maintains the inner cup leather firmly pressed against the cylinder walls at all times and prevents any leakage of air past the piston during the intake strokes thereof.

The piston rod 28 extends through the dash, and is threaded at its rearward end for the reception of a handle 33. The piston rod 28 is further provided with an annulus 34 secured thereto and against which is exerted the pressure of a spring 35, this spring being protected by having its opposite end abutting against the end of a sleeve 36, which is threadedly secured to the casting adjacent the bracket 2. In the unitary casting and just rearwardly of the cylinder 4 is a drain opening 16' which permits any lubricant which may leak past the piston 27 to escape into the engine compartment and avoids any possibility of such leakage getting into the operator's compartment.

The operation of my new and improved reservoir and pump unit is as follows: The cap 9 is first removed and the reservoir filled with lubricant which flows down the passages 17 and 18 and into the bottom of the valve chamber 5 until it is stopped by the valve 19. If desired, the cap 25 may be removed from the nipple 24' and a lubricant dispenser connected therewith to prime the system. Where no priming means is used, the operator should grasp the handle 33 and pull the piston to the rearward end of the cylinder, thereby filling such cylinder with lubricant which would be forced into the conduits 23 and 24 upon the return stroke of the piston. Several such reciprocations of the piston will fill the conduits 23 and 24 and thereafter each reciprocation of the pump will force lubricant to the bearings under a pressure which is determined by the strength of the spring 35 which serves to actuate the piston on its operative stroke when the lubricant in the reservoir 3' is almost exhausted, the cap 9 should be removed and fresh lubricant poured into the reservoir. This lubricant will pass down the tube 15 and through the strainer 13 and any air trapped thereunder will pass up the annular space between the tube 15 and the shell 17 and escape through the small opening between the tube 15 and the annular flange 16. If the reservoir 3' has been allowed to become empty and air forced into the system, it is usually desirable to force this air out of the system by attaching a high pressure lubricant dispenser to the nipple 24', although the trapped air may be completely discharged by several operations of the piston. Thereafter, the pump should be operated intermittently and as often as the service to which the bearings are subjected requires.

Certain subject-matter, disclosed but not claimed in this application, is claimed in my copending application, Serial No. 161,282, filed of even date herewith. Reference is also made to my Patent No. 1,710,959, of April 30, 1929, which has claims specific to an embodiment which is more broadly claimed in the present application and in said copending application.

Having thus described my invention, what I claim is:

1. Apparatus of the class described, comprising a lubricant reservoir, a pump integral therewith, a tube in said reservoir and having a strainer at its lower end, means located at the lower end of said tube for spacing it from the walls of said reservoir and other means at the top of said reservoir for spacing the upper end of said tube from the walls of said reservoir, said second spacing means preventing lubricant poured into said reservoir from passing downwardly between said tube and the walls of said reservoir, both of said spacing means permitting air trapped beneath said strainer to pass upwardly between said tube and the walls of said reservoir.

2. Apparatus of the class described, comprising a pump, a reservoir communicating therewith, an inner shell for said reservoir and spaced from the walls thereof, means to prevent lubricant poured into said reservoir from passing downwardly between said shell and the walls of said reservoir, and a strainer located at the bottom of said inner shell, air trapped beneath said strainer being permitted to pass upwardly between said inner shell and the walls of said reservoir.

3. Apparatus of the class described, comprising a reservoir having spaced inner and outer shells, spacing means at the upper end of said reservoir, said spacing means also preventing lubricant poured into said reservoir from passing downwardly between said shells, other spacing means at the lower end of said reservoir, and a strainer at the lower end of said inner shell, said spacing means permitting air trapped beneath said strainer when said reservoir is filled, to pass upwardly between said shells.

4. Apparatus of the class described comprising a lubricant pump, a reservoir integral therewith for supplying lubricant to said pump, an inner shell for said reservoir and spaced from the walls thereof, a strainer carried by a lower end of said inner shell, and a restricted passage between said inner shell and the walls of said reservoir, said restricted passage permitting free venting of air from beneath said strainer but serving to prevent passage of lubricant therethrough during the filling of said reservoir.

5. Apparatus of the class described comprising a lubricant reservoir having thin metallic sides, a partition in said reservoir defining a lubricant passage through which said reservoir is filled, a reinforcing member for the upper end of said reservoir and provided with a part cooperating with said partition to form a restricted passage permitting venting of air from the lower part of said reservoir during the filling operation, and a cover adapted to cooperate with said reinforcing member to form a lubricant tight seal.

In witness whereof, I hereunto subscribe my name this 30 day of December, 1926.

OSCAR U. ZERK.